United States Patent [19]
Matthews

[11] Patent Number: 5,809,111
[45] Date of Patent: Sep. 15, 1998

[54] TELEPHONE CONTROL MODULE AND USER SITE NETWORK AND METHODS OF OPERATION

[75] Inventor: Gordon H. Matthews, Austin, Tex.

[73] Assignee: Matthews Communications Management, Inc., Austin, Tex.

[21] Appl. No.: 626,724

[22] Filed: Apr. 1, 1996

[51] Int. Cl.[6] .............................. H04M 1/24; H04M 3/08; H04M 3/22

[52] U.S. Cl. ................................ 379/31; 379/2; 379/156; 379/165

[58] Field of Search .............................. 379/31, 156, 157, 379/158, 159, 160, 165, 177, 182, 197, 387, 219, 220, 164, 1–2, 27, 32; 370/201, 221, 272

[56] References Cited

U.S. PATENT DOCUMENTS

| | | | |
|---|---|---|---|
| 4,776,006 | 10/1988 | Comerford et al. | 379/159 |
| 4,807,225 | 2/1989 | Fitch | 370/71 |
| 5,136,585 | 8/1992 | Nizamuddin et al. | 370/110.1 |
| 5,195,086 | 3/1993 | Baumgartner et al. | |
| 5,263,083 | 11/1993 | Rust et al. | 379/157 |
| 5,483,577 | 1/1996 | Gulick | 379/67 |
| 5,550,900 | 8/1996 | Ensor et al. | 379/67 |
| 5,566,231 | 10/1996 | Sizer, II | 379/142 |
| 5,566,232 | 10/1996 | Sizer, II | 379/142 |
| 5,596,631 | 1/1997 | Chen | 379/157 |

*Primary Examiner*—Curtis Kuntz
*Assistant Examiner*—Binh K. Tieu
*Attorney, Agent, or Firm*—Baker & Botts, L.L.P.

[57] ABSTRACT

A multi-station telephone system having a telephone control module (24) based user site network is provided. The system includes a plurality of electronic devices (26) located at a user site (12). A site telephone line (20) is coupled to a telephone line (16) provided by a telephone network (10) and extends through the user site (12). A plurality of telephone control modules (24) are coupled to the site telephone line (20) and to associated electronic devices (26). The telephone control modules (24) are operable to monitor telephone line communications (32) on the site telephone line (20) and to monitor associated electronic devices (26). The telephone control modules (24) are also operable to isolate associated electronic devices from and couple them to the site telephone line (20). Each telephone control module (24) is further operable to communicate with other telephone control modules (24) to form a user site (12) network for providing control of telephone line communications.

44 Claims, 4 Drawing Sheets

TELEPHONE CONTROL MODULE AND USER SITE NETWORK AND METHODS OF OPERATION

TECHNICAL FIELD OF THE INVENTION

This invention relates in general to the field of electronic systems, and more particularly to a telephone control module and a user site network and methods of operation. cl BACKGROUND OF THE INVENTION A multi-station system can include one or more telephone lines connected to two or more electronic devices. In conventional multi-station telephone systems, a termination point located at the user site can be connected with a central office in a telephone network to provide the user site with one or more telephone lines. The termination point can be what is commonly called a "terminal strip."

Within the user site, site telephone lines can emanate from the terminal strip and connect to telephone outlets. In this manner, the telephone outlets can provide access to the telephone line or lines provided by the telephone network. Individual telephones and key-sets as well as other electronic devices (e.g., facsimile machines, answering machines, modems, personal computers and peripherals, etc.) can be connected to the telephone outlets and thereby connected to the telephone line or lines. With respect to a telephone line, the topology of a multi-station telephone system is often a star configuration, although other topologies are possible.

In conventional systems, telephone line communications between the various electronic devices of the multi-station telephone system and the telephone network can be ISDN (Integrated Service Digital Network) or POTS (Plain Old Telephone System) type communications. Telephone line communications may also be provided by other types of communications such as radio frequency or satellite based communications and, in the near future, cable systems. In many user sites, the site telephone lines that support telephone line communications include a number of pairs of wires. For a POTS type telephone line, for example, one pair of wires are used for standard telephone operation and are referred to as the tip and ring wires. Other types of communications use other configurations for the site telephone lines.

It is advantageous for a multi-station telephone system located at a user site to be provided with control, communication and call processing features beyond those available using conventional answering machines or personal computer applications.

Some user sites use PBX (Private Branch Exchange) systems which can provide call processing features such as automatic call answering, call forwarding, call transfer, conferencing, and voice mail as well as supporting intra-site telephone communication. PBX systems provide such features as part of an overall function to provide an interface between a larger number of individual telephone sets and a smaller number of trunk lines of the telephone network. Other user sites utilize conventional computer based systems to provide analogous call processing features.

However, conventional PBX and computer based systems are too expensive and complex for many user sites, such as personal residences or small businesses, that have one or more telephone lines connected to multiple telephones, key-sets or other electronic devices.

SUMMARY OF THE INVENTION

In accordance with the present invention, a telephone control module and user site network and methods of operation are provided that substantially eliminate or reduce disadvantages and problems associated with prior multi-station telephone systems.

According to one aspect of the present invention, a telephone control module for use in a multi-station telephone system is provided. The telephone control module includes a telephone line interface operable to couple to and interface with a site telephone line located in a user site where the site telephone line is coupled to a telephone line provided by a telephone network. The telephone control module also includes an electronic device interface operable to couple to and interface with an electronic device located at the user site. The telephone control module further includes a logic/control unit coupled to the telephone line interface and to the electronic device interface. The logic/control unit is operable to monitor telephone line communications on the site telephone line and to monitor the electronic device. The logic/control unit is also operable to isolate the electronic device from and couple the electronic device to the site telephone line. The logic/control unit is further operable to communicate with other telephone control modules to form a user site network for providing control of telephone line communications.

According to another aspect of the present invention, a multi-station telephone system having a telephone control module based user site network is provided. The system includes a plurality of electronic devices located at a user site. The system also includes a site telephone line coupled to a telephone line provided by a telephone network and extending through the user site. A plurality of telephone control modules are coupled to the site telephone line and to associated electronic devices. The telephone control modules are operable to monitor telephone line communications on the site telephone line and to monitor the associated electronic devices. The telephone control modules are also operable to isolate associated electronic devices from and to couple associated electronic devices to the site telephone line. Each telephone control module is further operable to communicate with other telephone control modules to form a user site network for providing control of telephone line communications.

According to a further aspect of the present invention, a user site network supported by a site telephone line is provided. A plurality of electronic devices are located at a user site, and a site telephone line extends through the user site. A plurality of telephone control modules are coupled to the site telephone line and to associated electronic devices. The telephone control modules are operable to monitor a state of associated electronic devices and to couple associated electronic devices to and isolate associated electronic devices from the site telephone line. Each telephone control module is further operable to communicate with other telephone control modules using the site telephone line to form a user site network between the plurality of electronic devices.

A technical advantage of the present invention is the transmission and reception of information between telephone control modules without limiting normal operation of the telephone line provided by the telephone network or the operation of the electronic devices coupled to the telephone control modules.

The use of telephone control modules to establish a user site network for communications between telephone control modules and to provide call processing features is also a technical advantage of the present invention.

The use of site telephone lines to support telephone control module communications is a further technical advantage of the present invention.

An ability to uniquely identify telephone control modules such that they can be addressed separately is another technical advantage of the present invention. This allows telephone control modules to be treated uniquely as necessary to implement call processing features such as intra-site communication or selective ringing of a particular telephone or group of telephones. The use of telephone control modules to provide intrasite communication between telephones or key-sets of a multi-station telephone system is a further technical advantage of the present invention.

BRIEF DESCRIPTION OF THE DRAWINGS

A more complete understanding of the present invention and advantages thereof may be acquired by referring to the following description taken in conjunction with the accompanying drawings in which like reference numbers indicate like features and wherein.

DETAILED DESCRIPTION OF THE INVENTION

Telephone Control Module Based User Site Network

Figure 1:
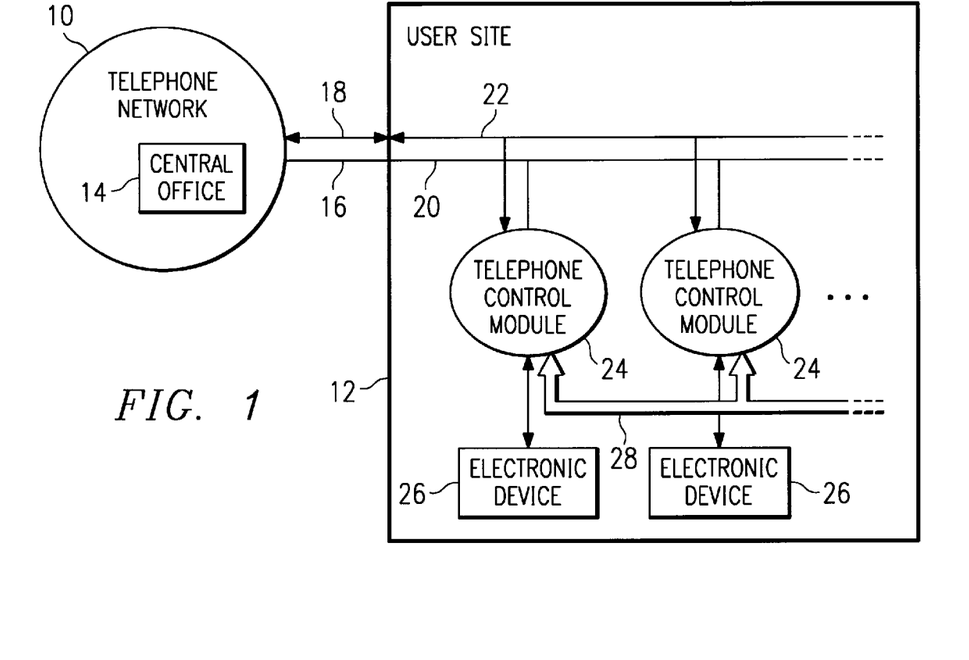
FIG. 1 is a block diagram of one embodiment of a multi-station telephone system having a telephone control module based user site network constructed according to the teachings of the present invention.

FIG. 1 is a block diagram of one embodiment of a multi-station telephone system having a telephone control module based user site network constructed according to the teachings of the present invention.

A telephone network 10 can be coupled to a user site 12 and can include a central office 14. Telephone network 10 can be a local telephone network, cellular network, cable system based telephone network or other network providing telecommunications interconnectivity.

Telephone network 10 can be coupled to user site 12 through a telephone line 16. Telephone line 16 supports telephone line communications 18 between telephone network 10 and user site 12. Telephone line 16 can comprise a combination of copper wire, optical fiber, radio frequency transmissions, or other medium upon or through which telephone line communications 18 can be supported. Telephone line communications 18 can be based upon an ISDN, POTS or other telephone line communication protocol.

User site 12 can include a site telephone line 20 which is coupled to telephone line 16 provided by telephone network 10. Site telephone line 20 supports telephone line communications 22 in user site 12. Telephone line communications 22 can be based upon an ISDN, POTS or other telephone communication protocol as appropriate for user site 12. Site telephone line 20 can comprise copper wire, optical fiber, radio frequency transmissions, or other suitable medium upon or through which telephone line communications 22 can be supported.

User site 12 includes a plurality of telephone control modules (TCMs) 24 and a plurality of electronic devices 26. Each telephone control module 24 is coupled to site telephone line 20 and can be coupled to an electronic device 26. Electronic devices 26 can comprise telephones, key-sets, facsimile machines, answering machines, modems, personal computers and peripherals, or other electronic devices.

Telephone control modules 24 can communicate with one another via TCM network communications 28 to form a user site network. TCM network communications 28 can be supported by site telephone line 20, by electric power lines in user site 12, by electromagnetic transmissions (i.e., radio frequency or infra-red signals) or by another appropriate medium.

TCM network communications 28 can be supported by site telephone line 20 without limiting the operation of electronic devices 26, telephone line communications 22, telephone line communications 18, telephone line 16, central office 14 or telephone network 10. In order to do so, TCM network communications 28 can be implemented using a packet based protocol carried by a modulated high frequency signal communicated across site telephone line 20. An alternative is to identify periods of time during which TCM network communications 28 should be avoided. A third alternative is for one telephone control module 24 (such as a TCM master described below) to be coupled to site telephone line 20 via an isolation device (e.g., a conventional RJ-31 jack) such that the telephone control module 24 can control the isolation device to isolate site telephone line 20 from telephone line 16. This isolation would allow TCM network communications 28 to occur in isolation from telephone network 10.

In operation, telephone control modules 24 can provide benefits to any system in which a telephone line 16 is connected to two or more electronic devices 26. Each telephone control module 24 can interface with site telephone line 20. One or more telephone control modules 24 can also interface with an associated electronic device 26.

Telephone control modules 24 collectively form a user site network to provide control and communication in the multi-station telephone system. In addition, telephone control modules 24 can implement call processing features for user site 12. Telephone control modules 24 can be arranged in a master/slave, peer-to-peer, or other appropriate topology to form the user site network. In a master/slave topology, a master telephone control module 24 may be different in structure from slave telephone control modules and may or may not be coupled to an associated electronic device 26.

Telephone control modules 24 can process incoming and outgoing calls and interact with one another via TCM network communications 28 to provide control, communications, call processing features or other desired functionality. Telephone control modules 24 can provide, for example, automatic call answering, call forwarding, call transfer, conferencing, voice mail as well as other call processing features. Among a wide range of call processing features, telephone control modules 26 also can use TCM network communications 28 to provide intrasite telephone communications between electronic devices 26 without requiring the use of or affecting telephone network 10.

The use of telephone control modules 24 to enhance a multi-station telephone system located at user site 12 is a technical advantage of the present invention. Another technical advantage of the present invention is the use of TCM network communications 28 between telephone control modules 24 to provide control, communication and call processing features. A further technical advantage of the present invention is the transmission and reception of information between telephone control modules 24 without limiting normal operation of telephone network 10 or electronic devices 26.

The use of site telephone line 20 to support TCM network communications 28 between telephone control modules 24 is also a technical advantage of the present invention. The use of telephone control modules 24 to provide intra-site communication between telephones and key-sets of a multi-station telephone system is also a technical advantage of the present invention.

Telephone Control Modules

Figure 2:
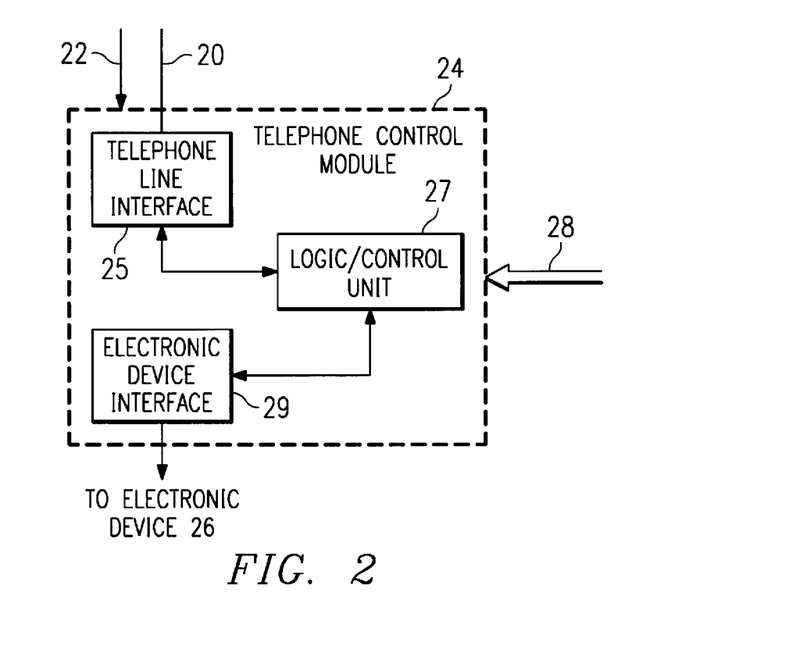
FIG. 2 is a block diagram of one embodiment of a telephone control module constructed according to the teachings of the present invention.

FIG. 2 is a block diagram of one embodiment of a telephone control module 24 constructed according to the teachings of the present invention. As shown, telephone control module 24 is coupled to site telephone line 20 and to an electronic device 26.

In the embodiment of FIG. 2, telephone control module 24 comprises a telephone line interface 25 which is coupled to site telephone line 20 and receives telephone line communications 22. A logic/control unit 27 is coupled to telephone line interface 25 and transmits and receives TCM network communications 28. Telephone control module 24 is also coupled to an electronic device interface 29 which is coupled to an electronic device 26, as shown.

In one embodiment of the present invention, telephone control module 24 receives TCM network communications 28 via site telephone line 20. In other embodiments of the present invention, telephone control module 24 receives TCM network communications 28 via a medium other than site telephone line 20 such as electric power lines or electromagnetic transmissions.

In operation, logic/control unit 27 monitors telephone line communications 22 on site telephone line 20 and monitors electronic device 26. Logic/control unit 27 operates to couple electronic device 26 to or isolate electronic device 26 from site telephone line 20. Logic/control unit 27 uses TCM network communications 28 to provide control, communication, and call processing features, including handling incoming and outgoing calls. TCM network communications 28 allow multiple telephone control modules 24 to create a user site network. Using the user site network, each telephone control module 24 can allow standard functional operation of electronic device 26 while also providing control, communication, and call processing features for a multi-station telephone system of which electronic device 26 is a part.

Master/Slave Topology

Figure 3:
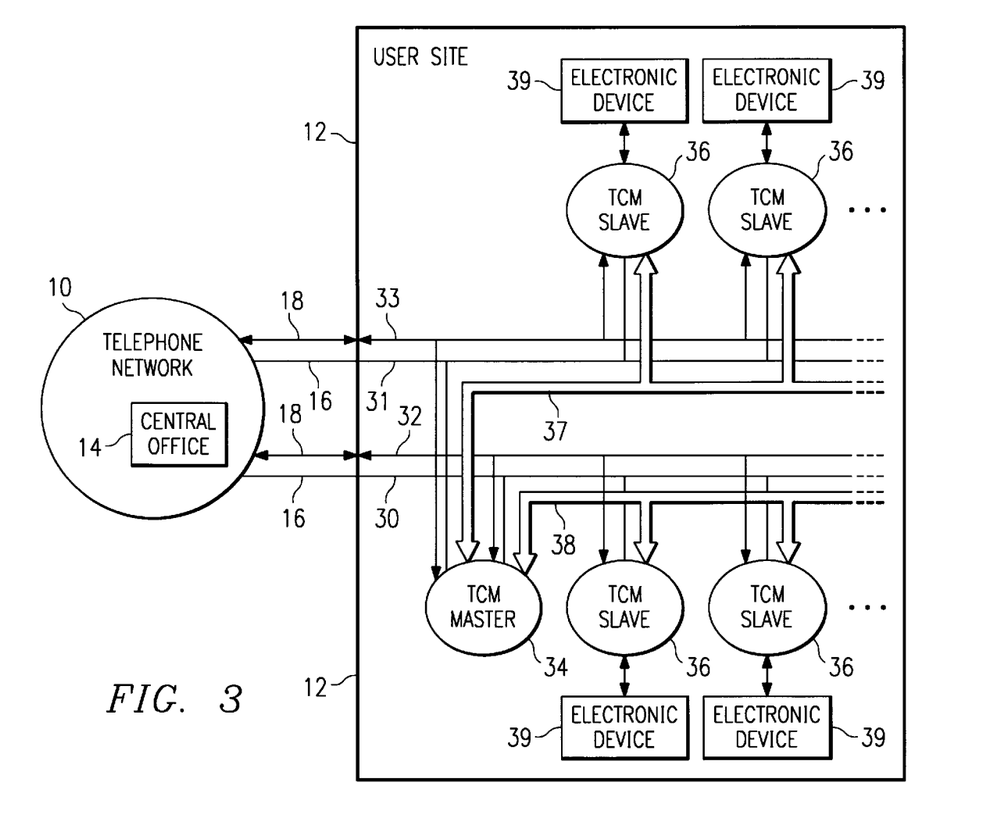
FIG. 3 is a block diagram of one implementation of a user site network having a master/slave topology according to the teachings of the present invention.

FIG. 3 is a block diagram of one implementation of a user site network having a master/slave topology according to the teachings of the present invention. As shown in FIG. 3, site telephone line 30 and site telephone line 31 are coupled to separate telephone lines 16 and support telephone line communications 32 and telephone line communications 33, respectively. Similar to the description above, telephone line communications 32 and 33 can be based upon an ISDN, POTS, or other telephone communication protocol. In the illustrated embodiment, both telephone lines 16 provide access to the same telephone network 10. In other embodiments, telephone lines 16 can provide access to different telephone networks. For example, one telephone line 16 may connect to a local telephone network and the other to a cable system based telephone network.

In the master/slave topology of FIG. 3, a telephone control module (TCM) master 34 is coupled to site telephone line 30 and to site telephone line 31. A first plurality of telephone control module (TCM) slaves 36 are coupled to site telephone line 30, and a second plurality of TCM slaves 36 are coupled to site telephone line 31. TCM master 34 and the first plurality of TCM slaves 36 communicate with one another via TCM network communications 38. TCM master 34 and the second plurality of TCM slaves 36 communicate with one another via TCM network communications 38. Each TCM slave 36 is coupled to an electronic device 39. In other embodiments, TCM master 34 could also be connected to an electronic device, and one or more of TCM slaves 36 may not be coupled to an electronic device 39.

In the embodiment of FIG. 3, TCM network communications 37 and 38 are supported by site telephone lines 31 and 30, respectively. TCM network communications 37 and 38 form a user site network between TCM master 34 and TCM slaves 36. In the master/slave topology, the interaction between TCM master 34 and TCM slaves 36 is analogous to a client/server topology of a local area network of personal computers. In other embodiments, TCM master 34 and TCM slaves 36 can communicate across physical media other than site telephone lines 30 and 31, as described above. In addition, other embodiments may only include one telephone line 16, may only include one set of TCM slaves 36, or may have a peer-to-peer topology or other network topology.

Telephone network 10 and central office 14 may not be isolated from TCM network communications 38 and 37 when supported by site telephone lines 30 and 31 because site telephone lines 30 and 31 may be coupled directly to telephone network 10 (e.g., at the terminal strip). However, as mentioned above, according to the present invention, TCM network communications 38 and 37 between TCM master 34 and TCM slaves 36 can be accomplished without limiting the operation or degrading the integrity of telephone network 10 or central office 14.

The user site network established by TCM network communications 38 and 37 can be used to provide various control, communication, and call processing features for a multi-station telephone system located at user site 12. These features can be provided to a single-line or multiple-line multi-station telephone system having multiple telephones or key-sets as found in many small businesses. For example, incoming telephone calls can be answered and processed by TCM master 34, and outgoing telephone calls can be processed and placed by TCM master 34. TCM master 34 also can communicate with TCM slaves 36 to provide bridging between multiple telephone lines, call forwarding, voice mail, conferencing, and other desired call processing features. It should be understood that numerous control, communication, and call processing features can be implemented using TCM master 34 and TCM slaves 36 as well as using telephone control modules in other network topologies.

In the embodiment of FIG. 3, TCM master 34 can operate, for example, to detect a caller ID of an incoming telephone call on one of telephone lines 16. TCM master 34 could then select a TCM slave 36 that is associated with a telephone that is an appropriate telephone to ring based upon the caller ID. TCM master 34 could then send information to the selected TCM slave 36, which in turn could cause the selected telephone to ring or otherwise indicate visually or audibly that an incoming call has been received.

With respect to an outgoing call, for example, a user at user site 12 could pick up any telephone connected to a TCM slave 36 and access functional capabilities of the TCM slave 36, TCM master 34, or one of the other electronic devices 39. One such electronic device 39 could be a speech controlled dialing device accessed under the control of TCM master 34.

In one implementation of the master/slave topology of FIG. 3, TCM master 34 can comprise an integrated circuit based telephone answering device such as an MSP58C80 Digital Telephone Answering Device (DTAD), having an MS320C25 core, available from TEXAS INSTRUMENTS INCORPORATED. In this implementation, electronic devices 39 can comprise one or more telephones or key-sets located throughout user site 12, and each TCM slave 36 can comprise an integrated circuit based communication device such as an MC143120 Neuron Chip available from MOTOROLA, INC. The MC143120 Neuron Chips and MSP58C80 DTAD chip can be coupled via site telephone lines 30 and 31 which can comprise the tip and ring wire of standard user site telephone lines. The MC143120 Neuron Chips and MSP58C80 DTAD chip can accomplish TCM network communications 38 and 37 across site telephone line 30 and 31 using a LONTALK communication protocol built into the MC143120 Neuron Chips or using other appropriate communication protocols.

Telephone Control Module for Use With a Standard Telephone

Figure 4:
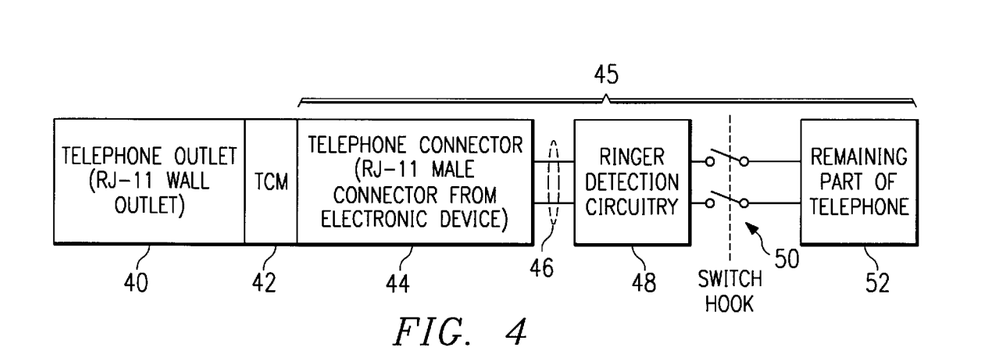
FIG. 4 is a block diagram of one embodiment of a telephone control module for use with a standard telephone according to the teachings of the present invention.

FIG. 4 is a block diagram of one embodiment of a telephone control module for use with a standard telephone according to the teachings of the present invention.

A telephone outlet 40, which can comprise a female RJ-11 outlet provides connection to the site telephone line of the user site. A telephone control module (TCM) 42 is connected into telephone outlet 40. A telephone connector 44 from an electronic device 45, which can comprise a male RJ-11 connector, is connected to telephone control module 42.

Although telephone control module 42 is shown as separate from electronic device 45, in other implementations, the two could be integrated into a single device. However, the illustrated embodiment shows the use of telephone control module 42 where equipment already in-place, including standard outlets and connectors, otherwise can remain unmodified. Telephone control module 42 can have telephones or key-sets connected to them as well as other electronic devices such as facsimile machines, modems, personal computers or personal computer peripherals.

In the embodiment of FIG. 4, electronic device 45 comprises a standard telephone. Tip and ring wiring 46 extends from telephone connector 44 to ringer detection circuitry 48. Ringer detection circuitry 48 is connected to switch hook contacts 50 which in turn are connected to the remaining part 52 of the telephone.

TCM network communications can be communicated between telephone control module 42 and other telephone control modules that are plugged into unmodified RJ-11 telephone outlets 40. In one embodiment, TCM network communications can be communicated across and supported by the tip and ring wiring that interconnects RJ-11 outlets of the user site.

In operation of a standard telephone line, when telephone 45 is in a standby mode, telephone 45 is on-hook with switch hook contacts 50 open. In this standby mode, the central office of the telephone network supplies a 50 volt DC signal between the tip and ring wires 46. If there is an incoming call, the central office can provide a signal which is in the range of 85 to 100 volts AC to ringer detection circuitry 48. Ringer detection circuitry 48 detects this signal and causes telephone 45 to ring. If the call is answered, switch hook contacts 50 are closed and current is supplied to the central office. The central office then stops the ringing signal, and the calling party is connected to the called party.

On the other hand, if a user wants to place a call, the user can pick up the telephone receiver of telephone 45 which causes switch hook contacts 50 to close. Current is thereby supplied to the central office which then causes a dial tone to be generated to the caller. The caller can dial a phone number, and the phone number is processed by the central office to ring the desired called telephone.

According to the teachings of the present invention, telephone control module 42 provides an interface between telephone 45 and telephone outlet 40. Telephone control module 42 operates to provide control, communication, and call processing features through communication with other telephone control modules without limiting the function of telephone 45.

Master/Slave Topology for Use With Standard Telephones

Figure 5:
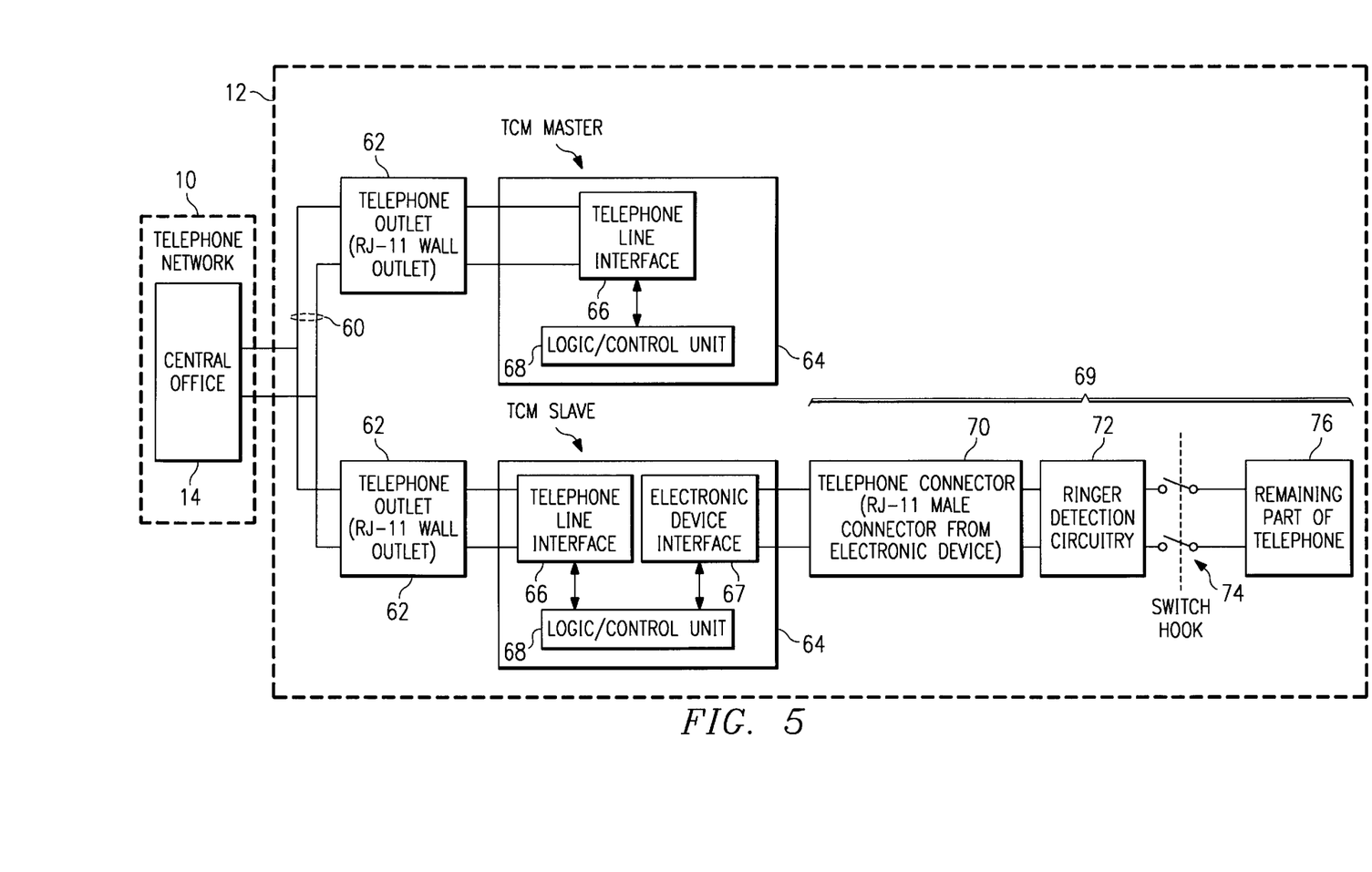
FIG. 5 is a block diagram of one embodiment of telephone control modules in a master/slave topology for use with a standard telephone according to the teachings of the present invention.

FIG. 5 is a block diagram of one embodiment of telephone control modules in a master/slave topology for use with standard telephones according to the teachings of the present invention. As shown, telephone network 10 is coupled to user site 12. Telephone network 10 can comprise a central office 14 that provides tip and ring signals across a telephone line to user site 12.

In user site 12, site telephone line 60 is coupled to central office 14 and extends to a plurality of telephone outlets 62. Telephone outlets 62 can comprise standard RJ-11 wall outlets. Each telephone outlet 62 can be coupled to a telephone control module (TCM) 64. In a master/slave topology, one telephone control module 64 can be a TCM master and at least one other telephone control module 64 can be a TCM slave, as shown.

TCM slave 64 can comprise a telephone line interface 66, an electronic device interface 67, and a logic/control unit 68. Telephone line interface 66 provides an interface to telephone outlet 62, and electronic device interface 67 provides an interface to an electronic device 69. In the illustrated embodiment, electronic device 69 comprises a standard telephone. TCM slave 64 can comprise a telephone line interface 66 and a logic/control unit 68. TCM slave 64 can isolate telephone 69 from telephone outlet 62 and couple telephone 69 to telephone outlet 62. TCM master 64 can manage the operation of TCM slave 64 to provide the control, communication and call processing features.

Each logic/control unit 68 is operable to monitor telephone outlet 62 and to control telephone line interface 66. Logic/control unit 68 in TCM slave 64 is also operable to control electronic device interface 67. Each logic/control unit 68 is operable to receive and transmit TCM network communications across the tip wire and/or ring wire of site telephone line 60.

Telephone 69 comprises a telephone connector 70 which can comprise an RJ-11 male connector. As mentioned above, in other implementations, telephone control module 64 and telephone 69 can be integrated into one device. However, the illustrated embodiment shows the placement of telephone control modules 64 where equipment, such as outlets and connectors, otherwise remain unmodified except for the addition of telephone control modules 64.

Telephone 69 comprises ringer detection circuitry 72 which is coupled to telephone connector 70. Switch hook contacts 74 are connected to ringer detection circuitry 72 and to the remaining part 76 of telephone 69. Telephone 69 can operate according to standard telephone operation as described above with respect to FIG. 4. It can be seen from FIG. 5 that the tip and ring wires of site telephone line 60 provide a physical electrical path between telephone control modules 64.

Telephone control modules 64 can communicate information with other telephone control modules 64 without degrading the operation of telephone 69 or telephone network 10. For example, by use of allowable frequencies and power levels, telephone control modules 64 can send and receive information between one another other without disturbing telephone 69 or telephone network 10. Although the topology of FIG. 5 is a master/slave topology, other topologies such as a peer-to-peer topology are also possible.

Process for Providing Call Processing Features

Figure 6:
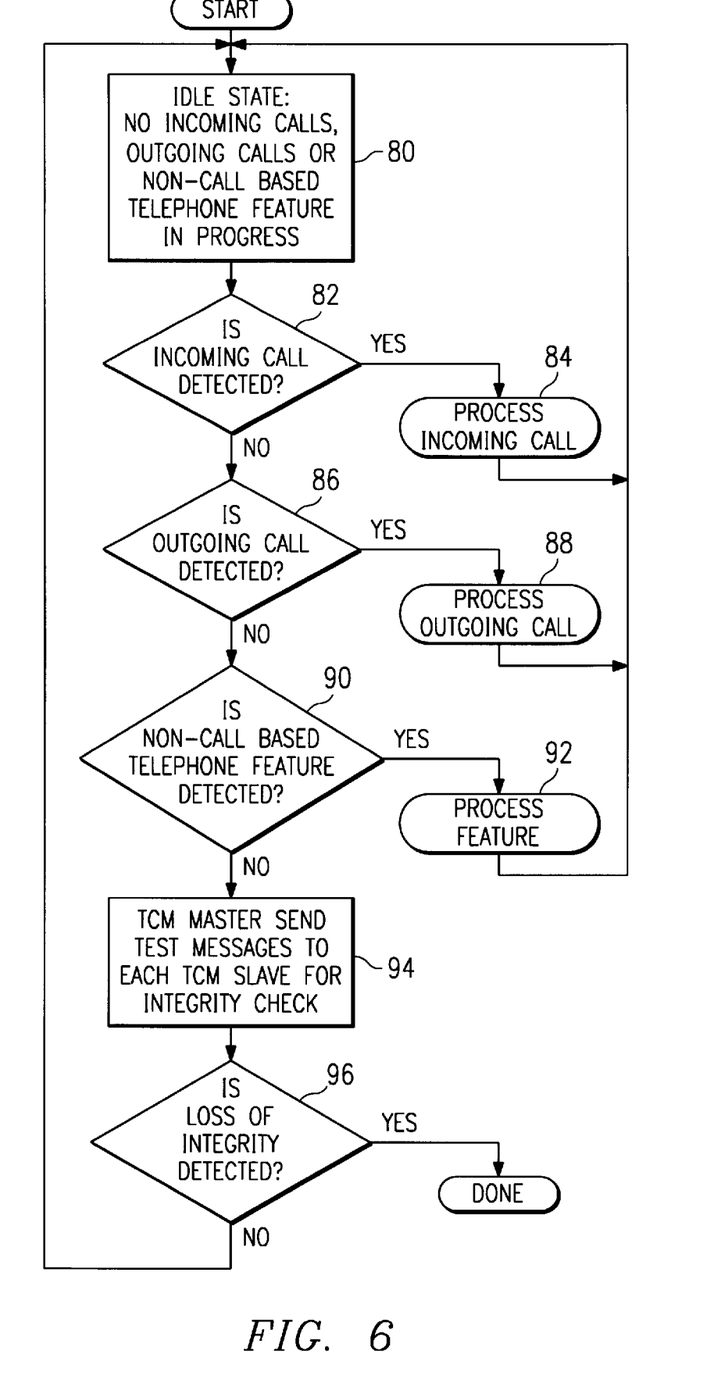
FIG. 6 is a flow chart of one embodiment of a process for providing call processing features to a multi-station telephone system according to the teachings of the present invention.

FIG. 6 is a flow chart of one embodiment of a process for providing call processing features to a multi-station telephone system according to the teachings of the present invention. The process of FIG. 6 can be implemented using the telephone control module (TCM) based user site network described above. In one embodiment, the process of FIG. 6 is managed by a TCM master in a master/slave topology.

In step 80, the TCM based user site network is in an idle state where no incoming call, outgoing call or non-call based call processing feature is in progress. In step 82, the network determines whether an incoming call is detected. If so, the network processes the incoming call in step 84. This incoming call processing is accomplished by communication between the telephone control modules. Incoming call processing can comprise routing the call to a selected electronic device, answering the call, providing access to voice mail or providing other appropriate control, communication or call processing feature. After processing the incoming call, the network returns to the idle state of step 80.

In step 86, the network determines whether an outgoing call is detected. If so, the network processes the outgoing call in step 88. Outgoing call processing is also accomplished by communication between the telephone control modules. Outgoing call processing can comprise providing voice dialing, conferencing or other appropriate control, communication or call processing feature. After processing the outgoing call, the network again returns to the idle state of step 80.

In step 90, the network determines whether a non-call based call processing feature is detected. If so, the network processes the non-call based call processing feature in step 92. Non-call based call processing features can comprise features such as accessing voice mail functions, modifying or defining parameters of the telephone system, and recording messages for incoming calls.

In step 94, test messages are sent periodically to check the integrity of the network. In one embodiment, a TCM master sends test messages to each TCM slave. Each TCM slave receives the test message and returns a status message to the TCM master. The TCM master thereby monitors the integrity of the network. In step 96, the network determines whether there has been a loss of integrity. If not, the network returns to the idle state of step 80. If integrity has been lost, the network can isolate itself from the multi-station telephone system to ensure no interference with normal operation.

In one implementation, for example, a user site can have at least one telephone connected to a TCM slave and a speech dialer connected to a TCM master. One example of detecting and processing an outgoing call is the use of the speech dialer. The process could be initiated by a user picking up the telephone and pressing an appropriate key sequence. The attached TCM slave could detect this key sequence and communicate with the TCM master. The TCM master and TCM slave can then cooperate to provide user access to the speech dialer while remaining essentially transparent to the user. The TCM master and TCM slave can allow the user to use the speech dialer to place a telephone call, for example, to another electronic device located in the user site or to an external number.

Example of Call Processing

An example of processing of an outgoing call and an incoming call in the context of a standard telephone line having tip and ring wiring should be helpful.

For an outgoing call in such an environment, the telephone switch hook is closed when the user picks up the telephone receiver. However, a TCM slave can keep the telephone isolated from the telephone line. This means that the central office of the public telephone network would not immediately detect the off-hook state.

Upon detecting the off-hook state, the TCM slave can communicate an information packet to a TCM master identifying itself as the originating TCM slave and notifying the TCM master of the off-hook status of the associated telephone. The TCM master can receive the information packet and direct the TCM slave to play an informational prompt to a user. For example, the user might hear: "Please dial a number or speak the name of the person you wish to call." If the user dials a number, the dialing can be detected by the TCM slave which, in turn, can connect the telephone to the telephone line to allow normal dialing operation of the telephone.

On the other hand, the user can state the name of the person to call. The TCM slave can send an information packet to the TCM master identifying the stated name, and the TCM master can forward that name to a speech dialer. The speech dialer can then indicate that the name was recognized by its voice recognizer and provide the telephone number to be dialed. At this point, the TCM master can issue an information packet to the TCM slave directing the TCM slave to connect the telephone to the telephone line. After connection, the central office then can detect the off-hook state and provide a dial tone. In response to the dial tone, the TCM master would dial the telephone number for the stated name.

If the name provided by the user is associated with a party located interior to the user site, the TCM master can identify the number as associated with another telephone located at the user site. The TCM master can then direct the TCM slave attached to the other telephone to ring that telephone. If the called interior party answers, the TCM master and respective TCM slaves can provide a path between the user and the called interior party allowing communication within the user site without needing additional site telephone lines.

The ability to uniquely identify each telephone control module such that it can be addressed separately from other telephone control modules is a technical advantage of the present invention. This allows telephone control modules to be treated uniquely as necessary to implement call processing features such as intra-site communication or selective ringing of a particular telephone or telephones.

For an incoming call in a standard environment, the calls can be detected by a TCM master by monitoring the site telephone line such as tip and ring wiring. The TCM master can be set, for example, to answer all incoming calls after a predetermined number of rings. By communicating with TCM slaves, the TCM master can direct the call to a selected telephone or can direct the call to all of the telephones at the user site. The TCM master also can simply allow each TCM slave to determine on its own whether to connect an attached electronic device. In addition, if available, the TCM master can collect and process caller ID information transmitted by the telephone network. This caller ID information can be useful for processing an incoming call based on stored knowledge concerning the calling party.

After answering an incoming call, the TCM master can be programmed to provide an automated attendant function. Initially, the TCM master can cause a prompt to be played to the caller that could direct the caller to speak a name or enter a number identifying the party the caller wants to reach. After receiving a response, the TCM master can inform the caller that the call is being processed, place the call on hold, and perform one of many functions.

For example, the TCM master could send an information packet to a selected TCM slave directing the TCM slave to cause an attached telephone to ring. In this manner, the call can be directed to a telephone associated with the called party. The TCM master could send an information packet to all TCM slaves directing each to cause an attached telephone to ring a distinctive ringing pattern unique to the called party.

The TCM master also could send an information packet to a TCM slave that is attached to a speaker/microphone. The TCM slave could play the recorded response of the caller. The called party could then be prompted to respond whether the called party wanted to accept or reject the call. If the call is accepted, the TCM slave could connect the attached telephone. If the call is rejected, the TCM master could take control and direct the call to a voice mail system for accepting a message from the caller.

Although the present invention has been described in detail, it should be understood that various changes, substitutions and alterations can be made hereto without departing from the spirit and scope of the invention as defined by the appended claims.

What is claimed is:

1. A telephone control module for use in a multi-station telephone system, the telephone control module comprising:
   a telephone line interface operable to couple to and interface with a site telephone line located in a user site, the site telephone line coupled to a telephone line provided by a telephone network;
   an electronic device interface operable to couple to and interface with an electronic device located at a user site; and
   a logic/control unit coupled to the telephone line interface and to the electronic device interface, the logic/control unit operable to monitor a state of telephone line communications on the site telephone line and to monitor a state of the electronic device, the logic/control unit also operable to couple the electronic device to and isolate the electronic device from the site telephone line;
   the logic/control unit further operable to communicate with other telephone control modules to form a user site network for providing control of telephone line communications.

2. The telephone control module of claim 1, wherein the logic/control unit is operable to communicate with other telephone control modules across the site telephone line, the logic/control unit communicating across the site telephone line without degrading the integrity of the telephone line or the telephone network.

3. The telephone control module of claim 2, wherein the telephone line interface is operable to interface with a site telephone line comprising a tip wire and a ring wire and wherein the logic/control unit is operable to communicate with other telephone control modules across the tip wire.

4. The telephone control module of claim 1, wherein the logic/control unit is further operable to ring a distinctive ringing pattern unique to a called party.

5. The telephone control module of claim 1, wherein the electronic device interface is operable to interface with a telephone.

6. The telephone control module of claim 5, wherein the logic/control unit is operable to communicate with other telephone control modules to provide call processing features.

7. The telephone control module of claim 1, wherein the telephone line interface is operable to interface with a site telephone line comprising a tip wire and a ring wire.

8. The telephone control module of claim 7, wherein the logic/control unit is operable to monitor a state of the telephone line and a state of the electronic device by monitoring the tip wire and the ring wire.

9. The telephone control module of claim 1, wherein the telephone line interface is operable to couple to the site telephone line via a telephone outlet located in the user site.

10. A multi-station telephone system having a telephone control module based user site network, comprising:
    a plurality of electronic devices located at a user site;
    a site telephone line coupled to a telephone line provided by a telephone network, the site telephone line extending through the user site; and
    a plurality of telephone control modules coupled to the site telephone line and to associated electronic devices, the telephone control modules operable to monitor a state of telephone line communications on the site telephone line and to monitor a state of associated electronic devices and operable to couple associated electronic devices to and isolate associated electronic devices from the site telephone line;
    each telephone control module further operable to communicate using a packet based protocol carried by a high frequency signal with other telephone control modules to form a user site network for providing control of telephone line communications.

11. The system of claim 10, wherein the plurality of telephone control modules comprises a master and at least one slave forming the user site network.

12. The system of claim 10, wherein the plurality of telephone control modules form a peer-to-peer user site network without a need for a central control unit.

13. The system of claim 10, wherein the plurality of telephone control modules are operable to communicate across the site telephone line, the telephone control modules communicating across the site telephone line without degrading the integrity of the telephone line or the telephone network.

14. The system of claim 13, wherein the site telephone line comprises a tip wire and a ring wire and the plurality of telephone control units are operable to communicate across the tip wire.

15. The system of claim 10, wherein the plurality of telephone control modules are operable to ring a distinctive ringing pattern unique to a called party.

16. The system of claim 10, wherein the plurality of electronic devices comprises at least one telephone.

17. The system of claim 16, wherein the telephone control modules are operable to form a user site network for providing call processing features.

18. The system of claim 10, wherein the site telephone line comprises a tip wire and a ring wire.

19. The system of claim 18, wherein the plurality of telephone control modules are operable to monitor a state of the telephone line and a state of the electronic device by monitoring the ring wire.

20. The system of claim 10, further comprising a second plurality of telephone control module slaves coupled to a second site telephone line and operable to communicate with the master such that the master provides a bridge between the site telephone lines.

21. The system of claim 20, wherein the second site telephone line is coupled to a telephone line provided by a cable system based telephone network.

22. The system of claim 10, wherein each telephone control module comprises:
   a telephone line interface coupled to and operable to interface with the site telephone line;
   an electronic device interface coupled to and operable to interface with an associated electronic device; and
   a logic/control unit coupled to the telephone line interface and to the electronic device interface, the logic/control unit operable to manage operation of the telephone control module.

23. The system of claim 22, wherein the logic/control unit is operable to connect an associated electronic device to the site telephone line.

24. The system of claim 10, wherein the site telephone line terminates in the user site at a plurality of telephone outlets and the plurality of telephone control modules are operable to connect to a telephone outlet.

25. The system of claim 11, wherein one of the master telephone control module is operable to receive a packet representing a stated name and can forward the stated name to a speech dialer.

26. The system of claim 10, wherein the master telephone control module can direct the slave telephone control module to ring a distinctive ringing pattern unique to a called party.

27. A user site network supported by a site telephone line, comprising:
   a plurality of electronic devices located at a user site;
   a site telephone line extending through the user site; and
   a plurality of telephone control modules coupled to the site telephone line and to associated electronic devices, the telephone control modules operable to monitor a state of associated electronic devices and to couple associated electronic devices to and isolate associated electronic devices from the site telephone line;
   each telephone control module further operable to communicate using a packet based protocol carried by a high frequency signal with other telephone control modules across the site telephone line to form a user site network between the plurality of electronic devices.

28. The user site network of claim 27, wherein at least one of the plurality of electronic devices comprises a personal computer.

29. The user site network of claim 28, wherein at least one of the plurality of electronic devices comprises a personal computer peripheral device.

30. The user site network of claim 27, wherein the plurality of telephone control modules form a peer-to-peer user site network without a need for a central control unit.

31. A method for controlling telephone line communications in a multi-station telephone system, comprising:
   coupling a plurality of telephone control modules to a site telephone line and to associated electronic devices;
   forming a user site network between the plurality of telephone control modules;
   monitoring a state of telephone line communications on the site telephone line and a state of associated electronic devices using the telephone control modules;
   coupling associated electronic devices to and isolating associated electronic devices from the site telephone line using the telephone control modules; and
   communicating information, using a packet based protocol carried by a high frequency signal, between the telephone control modules to provide control of telephone line communications.

32. The method of claim 31, wherein forming the user site network comprises forming a user site network having a master/slave topology.

33. The method of claim 31, wherein forming the user site network comprises forming a user site network having a peer-to-peer topology without a need for a central control unit.

34. The method of claim 31, wherein communicating comprises communicating information between the plurality of telephone control modules across the site telephone line without degrading the integrity of the telephone line or the telephone network.

35. A method for controlling telephone line communications of a multi-station telephone system, comprising:
   coupling a telephone control module to an electronic device;
   monitoring a state of telephone line communications on the site telephone line and a state of the electronic device;
   coupling the electronic device to and isolating the electronic device from the site telephone line; and
   communicating information, using a packet based protocol carried by a high frequency signal, with other telephone control modules to form a user site network for providing control of telephone line communications.

36. The method of claim 35, wherein communicating comprises communicating across the site telephone line without degrading the integrity of the telephone line or the telephone network.

37. The method of claim 35, wherein communicating is accomplished in a master/slave user site network having a master/slave topology.

38. The method of claim 35, wherein communicating is accomplished in a user site network having a peer-to-peer topology without a need for a central control unit.

39. The method of claim 31, further comprising forwarding, from one of the telephone control modules, a stated name to a speech dialer.

40. The method of claim 31, further comprising directing the telephone control modules to ring a distinctive ringing pattern unique to a called party.

41. The method of claim 31, further comprising, from a telephone control module, prompting a called party to respond whether the called party wanted to accept or reject an incoming call.

42. The method of claim 35, further comprising forwarding, from one of the telephone control modules, a stated name to a speech dialer.

43. The method of claim 35, further comprising directing the telephone control modules to ring a distinctive ringing pattern unique to a called party.

44. The method of claim 35, further comprising, from a telephone control module, prompting a called party to respond whether the called party wanted to accept or reject an incoming call.

* * * * *